March 9, 1937. R. R. OSBORN 2,073,350
WING TRUSS
Filed Jan. 23, 1934
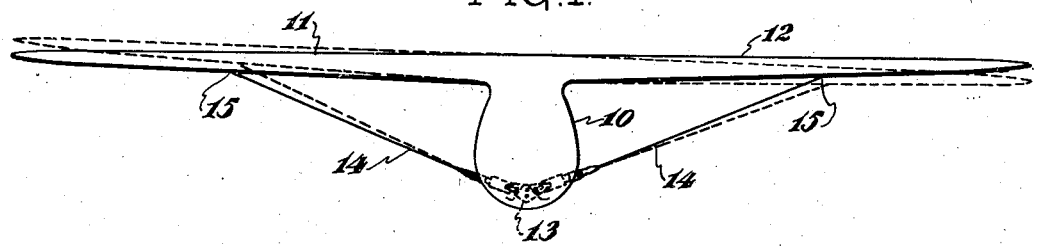
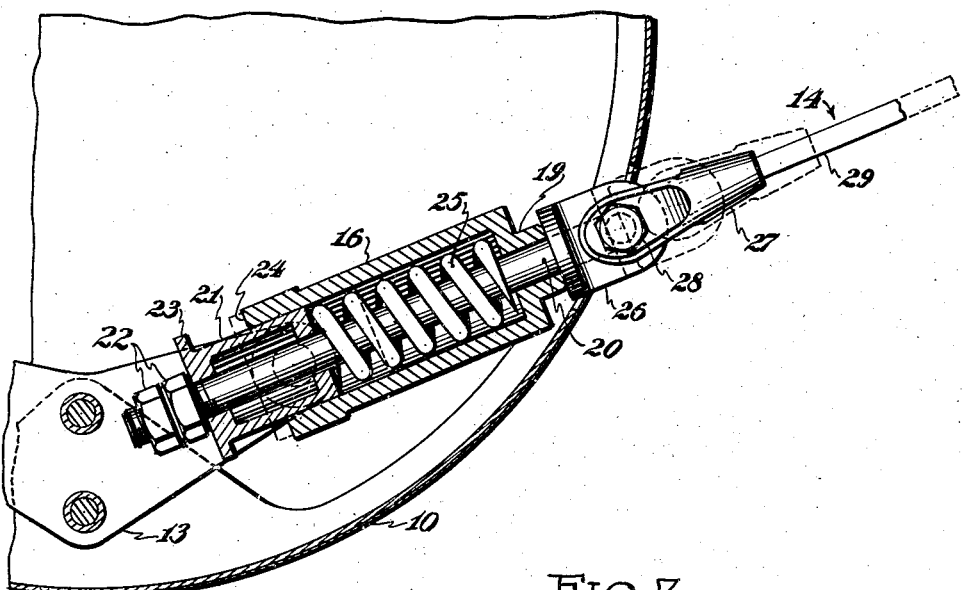
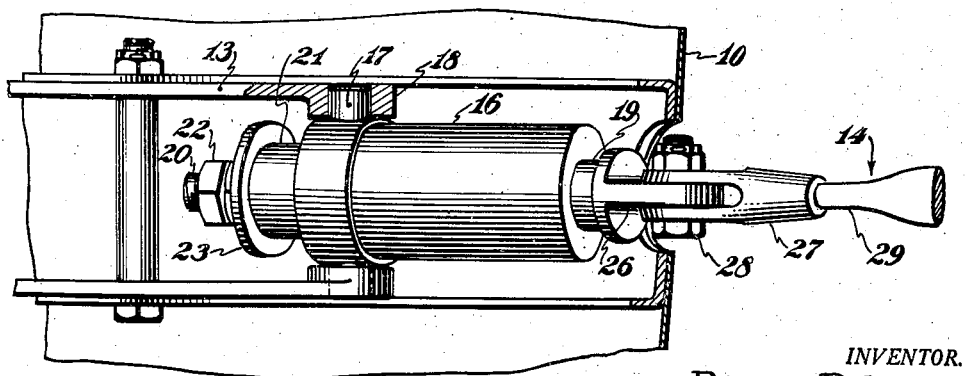
INVENTOR.
ROBERT R. OSBORN.
BY
ATTORNEYS.

Patented Mar. 9, 1937

2,073,350

UNITED STATES PATENT OFFICE 2,073,350

WING TRUSS

Robert R. Osborn, Kenmore, N. Y., assignor, by mesne assignments, to Curtiss-Wright Corporation, a corporation of New York Application January 23, 1934, Serial No. 707,883

2 Claims. (Cl. 244—38)

This invention relates to aircraft, and more particularly to improved methods for bracing the wing structure of aircraft.

The invention contemplates broadly the design of aircraft wing structures, and more specifically, provides an auxiliary resilient brace for assuming certain of the lifting loads imposed upon the wing. In the past, it has been the practice to design airplane wings, either of the biplane or monoplane type, so that the whole wing assembly is a rigid structure, the design of the structure being organized so that the maximum loads to which the wing may be subject in flight are taken care of. This has resulted, in many cases, in superfluous weight, for the following reasons—particularly in military aircraft, aerobatics involve the necessity of inverted flight. The maximum normal loads to which the wing may be subject in inverted flight, are found to be somewhat less than the maximum loads imposed upon the wing when the aircraft is in an upright, or more or less normal flight attitude. In the normal flight attitude, maneuvers such as pulling out of a power dive, roll, etc., impose the maximum possible lifting stresses on the wing structure, which are of a magnitude considerably greater than the maximum reverse loads on the wings, resultant from inverted flight.

It has been found, as a result of design evolution, that cantilever wings lend themselves to high speed characteristics for the airplane, but to properly withstand the maximum stresses which may be imposed on the wing, such cantilever wings must be of rather thick section, which has a tendency to impair their speed characteristics, due to increased drag and frontal area. If the cantilever wing were designed for load factors of ordinary flight, and of inverted flight, the wing section could be made substantially thinner, thereby giving it greater speed characteristics. To properly safeguard such a wing against failure in the maximum stress conditions above mentioned, it thereby becomes necessary to add external wing bracing. Such external wing bracing in itself, is old in the art, but, under the design conditions outlined, they have previously taken the form of rigid lift struts or diagonal bracing struts having in themselves considerable frontal area.

By "ordinary flight" is meant flight where movement of the aircraft is substantially rectilinear and where, therefore, the wing is uniformly and moderately stressed. The maximum stress conditions likely to be encountered in the operation of the aircraft occur when high acceleration forces are imposed thereon, as when the direction of travel of the aircraft is suddenly changed. Maneuvers for imposing such maximum stresses involve, so far as lift stresses are concerned, a violent alteration of the longitudinal trim of the aircraft at high speed, such as the "pull out" after a dive, tight turns involving vertical or nearly vertical banks, and rolls. The difference in the lift load factors imposed in these various conditions of flight is brought out by the design requirements for military aircraft, wherein the maximum positive lift, under low angle of attack conditions, involves a load factor of 8.5. Maneuvers which may be engaged in to stress the wing within this load factor would involve high speed flight and gradual changes in longitudinal trim of the aircraft, such as nosing into a dive and comparatively flat high speed climbing and turning. The maximum reverse load factor forming the design requirement is 8, the maneuver involved for this, being landing. The maximum reverse load factor for inverted flight under any conditions is only 4. Furthermore, the maximum load factor for high angle of attack conditions in upright flight is 12.5. This load factor is met by the extreme maneuvers to which the aircraft may be subjected, such as pulling out of a power dive and other such violent maneuvers.

It is apparent that the normal upright load factor of 8.5 is substantially the same as the maximum reverse load factor of 8 and, with uniform, efficiently designed wing spars, if the wing had only to withstand the 8.5 load factor, a relatively thin section wing may be built having a high structural efficiency. On the other hand, if the wing were built to meet the upright load factor of 12.5 and the inverted load factor of 8, either part of the wing structure would be redundant or the wing would be unsymmetrically and inefficiently designed, and in any event, a greater thickness would have to be built therein to meet the 12.5 load factor, thereby tending to increase the drag of the wing and consequently to decrease its speed capability. It is therefore an object of this invention to provide a wing which is sufficient in itself to withstand the substantially equal maximum reverse loads and the normal upright loads, and to assume the upright overloads to which the wing may be subjected by suitable external bracing means, which means will not reversely load the wing when the latter is subject to the inverted flight or moderate upright flight conditions.

It is an object of my invention, therefore, to provide low drag external wing bracing means in combination with a cantilever wing so stressed that the wing will take normal flight loads, and that the external bracing means will assume loads in excess of normal. It is unnecessary for the proper exposition of the details of this invention to go into the specific structure of the wing, since such structures are well known in the art, and the design thereof is made according to the flight requirements for which the aircraft is designed. It is sufficient, therefore, to state that the cantilever wing will be designed to assume load factors such as will be encountered in normal level flight, and such as may be accepted as the maximum load for inverted flight. For assuming the excess loads in the upright flight attitude, wire bracing means are provided, extending from a low point in the fuselage to the mid-portion of the wing, such wire bracing means having inherently low drag characteristics which will have a minimum tendency to impede forward speed of the aircraft.

It is likewise an object of the invention to provide a resilient shock absorbing mechanism in the external wire wing bracing, so that reversal of load on the wing will not tend to impose sudden severe strains on the wires which otherwise might snap, due to the shock load.

A further object is to provide in the resilient mechanism above referred to, means whereby said mechanism will become rigid after a certain stress is imposed thereon, so that the wire bracing means will then assume the full amount of excess load which may be applied upon the wing.

Generally, the invention is applied to a high wing cantilever monoplane, wherein the wing is designed for normal flight loads and maximum inverted flight loads. From the lower portion of the fuselage, wire lift braces extend outwardly and upwardly to a point intermediate the span of the cantilever wing. Intermediate the length of the wing braces, a tubular member is located, such tubular member being non-resiliently attached to the fuselage. Within the tubular member, a coil spring is housed, abutting at one end against the partial closure formed at the outer end of the tubular member. The inner end of the spring abuts against a plug slidable within the tubular member, said plug being fixed to the wire wing brace, part of which is slidable within the tubular member. An abutment provided on the plug serves to limit the motion of the wing brace with respect to the tubular member, so that, after partial compression of the spring contact of the abutment and the tubular member takes place, after which stresses are directly taken between the fuselage and the wing, the resilient spring thereby becoming inactive.

Further objects of the invention will become apparent from a reading of the attached specification and claims, and from a consideration of the drawing, in which similar numbers indicate similar parts, and in which:

Fig. 1 is a front elevation of an airplane including my invention, the left wing in solid lines being in normal or unloaded position, while the right wing in solid lines is shown in the overstressed position;

Fig. 2 is a section viewed from the front of the connection of the wing bracing mechanism to the fuselage; and Fig. 3 is a plan, partly in section, of the mechanism of Fig. 2.

Referring to Fig. 1, from the fuselage 10, cantilever wings 11 and 12 extend transversely, these wings being designed, in a manner well known to those familiar with the art, to assume the maximum stresses to which the aircraft may be subjected in inverted flight. Centrally, in the bottom of the fuselage structure, a fitting 13 is fixed, and from said fitting low drag wing braces 14 extend through the fuselage, and upwardly and outwardly to a point 15, where they are attached intermediate the wing span.

Referring now to Figs. 2 and 3, a tubular member 16 is provided at its inner end with trunnions 17 fitting in a portion 18 of the fitting 13. The outer end of the tubular member is formed with a bored closure 19 through which a rod 20 is freely slidable. A plug 21, having an outside diameter such that it will slide freely within the open end of the tubular member 16, is slipped over the rod 20 and held thereon by means of nuts 22 threaded on the rod. The plug 21 is provided with a shoulder or abutment 23 which, when the rod is outwardly drawn, will abut against the end 24 of the tubular member, as shown by dotted lines. Within the tubular member and adapted to abut respectively against the inner end of the plug and against the closure 19, is a spring 25. The outer end of the rod 20 is provided with a clevis head 26, to which a clevis 27 may be pinned by the bolt 28. Within the socket of the clevis, a streamline brace wire 29 is received, this wire 29 forming the principal external portion of the wing brace 14. Obviously, the mechanism shown in Figs. 2 and 3, depicted for the right hand wing, is duplicated for the left hand wing on the opposite side of the fitting 13.

It should also be noted that the fully extended length of the spring 25 is slightly less than the length of the socket provided by the plug 21 and the closure 19, when no stress is imposed on the brace 14. The head 26, when the brace 14 is unstressed, may abut against the closure 19 to form a limiting stop, so that, when no load or reverse load is imposed on the wing, the spring 25 cannot tend to pull the wing tip down.

In operation, the wings 11 and 12 deflect to a certain extent under load. In ordinary upright flight, or in inverted flight, the wings alone are capable of assuming the load imposed thereon, in which condition, the brace member 14 is relatively unstressed. When the craft is in its upright or normal attitude, and when loads are imposed thereon which will tend to deflect the wings to a considerable degree, the brace 14 becomes tight, imposing a stress on the spring 25 and thereby resiliently imposing a stress on the fitting 13. As the degree of such wing loading is increased, the spring 25 is further deflected until the abutment 23 of the plug 21 finally contacts the end 24 of the tubular member 16. The degree of tension imposed upon the wing brace 14 which will cause contact of the abutment with the tube end is adjusted to occur substantially at the point when the inherent load factor of the wing 11 or 12 reaches its limit. Thereafter, with still greater loads imposed upon the wing, the excess load will be rigidly taken up by the brace member 14.

In case the maneuver should cause sudden imposition of load on the brace members, the spring 25 acts, as it were, as a shock absorber, to prevent shock stresses on the brace member. If the brace member where wholly rigid, such shock stress might readily cause breakage thereof. By the shortness of the spring 25, and by the abutment of the clevis head 26 against the closure 19, the brace 14 cannot tend to deflect the wing downwardly. Without this feature, it would be possible for the inverted flight loads upon the wing to be increased by the brace tension, which, if the inverted flight loads were high, might become dangerous.

The wire brace 29 is, by the construction outlined, resiliently carried, and by its small cross section, normally offers little resistance to the forward speed of the aircraft. In combination with the wing, which as previously mentioned, may be of relatively thin section cantilever construction, the minimum frontal area and minimum parasite drag may be maintained for the aircraft, thereby enabling greater speed to be obtained. The trunnion mounting 17 of the tubular member, along with the clevis 28, allows slight oscillation of the brace member 14, tending to prevent fatigue of the wire 29 under the normal vibration incurred in service.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an airplane, a body, a cantilever wing thereon designed within such limits as to withstand, without external bracing, all lift stresses encountered in substantially rectilinear flight and all anti-lift stresses encountered in inverted flight and in landing, though being incapable of withstanding, without external bracing, all of the lift stresses encountered in the execution of maneuvers of the airplane due to pronounced curvilinear flight, external bracing means for said wing organized to remain inactive during said substantially rectilinear flight comprising a brace member extending between the body and the wing, and means responsive in its operation to the imposition of the added stresses due to said pronounced curvilinear flight for rendering said brace means active to assume the difference in stress between the stresses imposed on the wing and the stresses which the wing, by itself, is capable of withstanding.

2. In an airplane, a body, a cantilever wing thereon designed within such limits of strength as to withstand without external bracing, all lift stresses encountered in normal substantially rectilinear flight, but being so limited in strength as to be incapable of withstanding, without external bracing, all of the lift stresses encountered in the execution of maneuvers of the airplane in sharply accelerated curvilinear flight, a tensile external brace for said wing extending therefrom to said body, and means for effecting relaxation of said brace during those periods when the wing is subjected to the substantially rectilinear normal flight conditions, and for tensioning said brace during those periods when the wing is subjected to the sharply accelerated curvilinear flight conditions.

ROBERT R. OSBORN.